Nov. 24, 1970  I. S. SHAH  3,542,511
REMOVAL OF SULFUR DIOXIDE FROM WASTE GASES
Filed Jan. 27, 1969
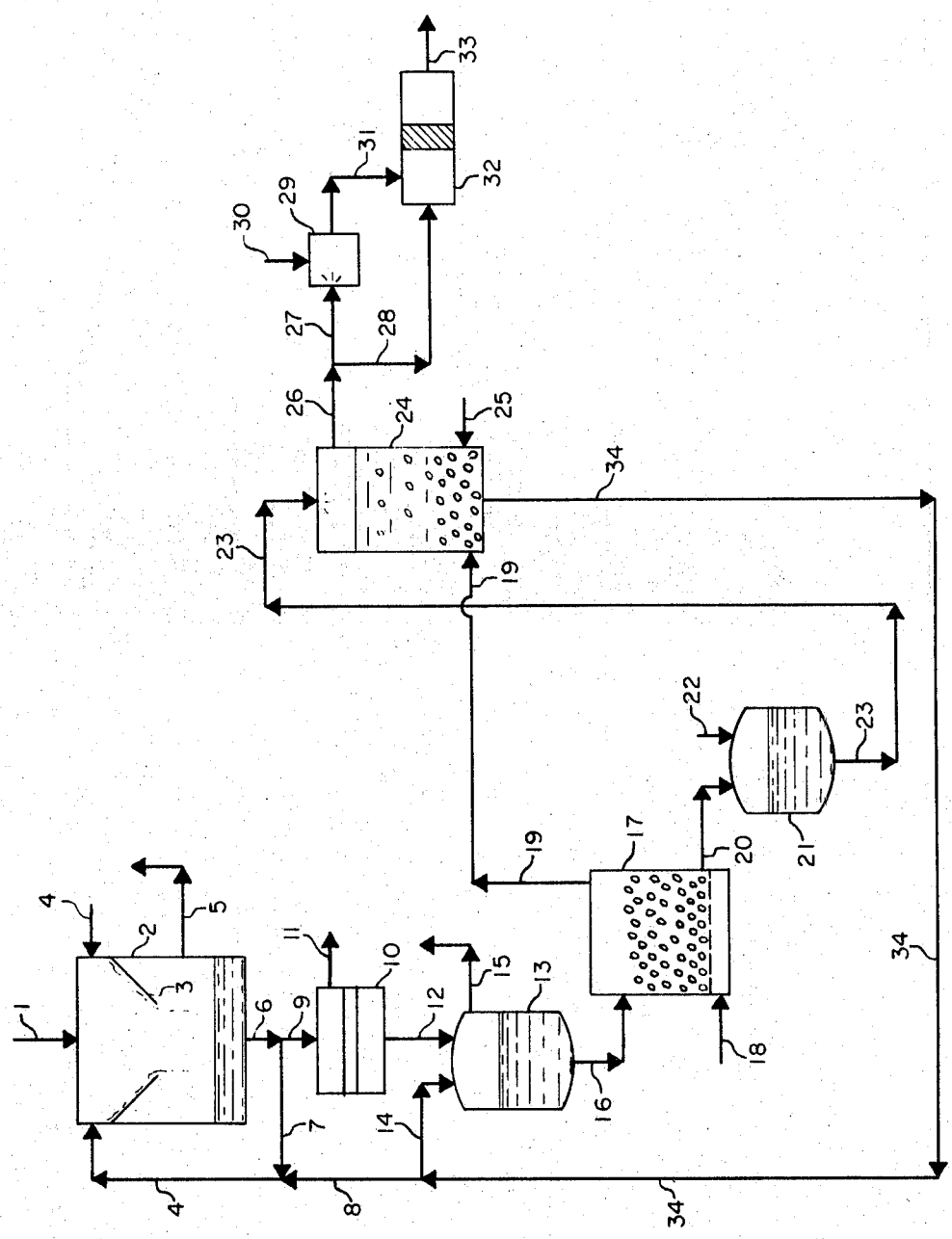
INDRAVADAN S. SHAH
INVENTOR.
BY *J. T. Chaloly*
AGENT

United States Patent Office 3,542,511
Patented Nov. 24, 1970

3,542,511
REMOVAL OF SULFUR DIOXIDE FROM WASTE GASES
Indravadan S. Shah, Forest Hills, N.Y., assignor to Chemical Construction Corporation, New York, N.Y., a corporation of Delaware
Filed Jan. 27, 1969, Ser. No. 794,215
Int. Cl. C01b *17/72, 17/00*
U.S. Cl. 23—168
7 Claims

ABSTRACT OF THE DISCLOSURE

A waste gas stream containing sulfur dioxide is scrubbed with aqueous sodium sulfite solution to dissolve sulfur dioxide and form sodium bisulfite in solution. A portion of the resulting solution is reacted with sodium carbonate to convert bisulfite to sulfite, and the sodium sulfite is reacted with a carbon-containing reducing medium to form a sodium sulfide smelt or solid particles of sodium sulfide, which is dissolved in water and reacted with a gas stream containing carbon dioxide, to form a gaseous stream containing hydrogen sulfide and regenerate sodium carbonate for recycle. The hydrogen sulfide is recovered in the form of a valuable sulfur-containing product such as elemental sulfur or sulfuric acid.

BACKGROUND OF THE INVENTION

Field of the invention

The invention relates to the removal of a sulfur dioxide contaminant from a waste gas stream, such as a flue gas derived from the combustion of a sulfur-containing carbonaceous or hydrocarbon fuel, or the tail gas from a sulfuric acid production process, before the waste gas stream is released to the atmosphere, so as to prevent air pollution and recover the sulfur dioxide in the form of a valuable sulfur-containing product. Thus, the invention is particularly applicable to the removal of sulfur dioxide from the waste gases of power plants, steam generators, space heating boilers and chemical plants such as sulfuric acid production facilities and organic sulfonation processes.

Description of the prior art

Numerous procedures and systems have been proposed or developed for the removal of sulfur oxides and principally sulfur dioxide, from a waste gas stream such as flue gas, and for the recovery of the sulfur dioxide in a usable form as a commercial product. Many prior art procedures employ alkaline solutions for this purpose. U.S. Pat. No. 2,849,292 is typical of prior art procedures, and U.S. Pats. Nos. 2,919,976 and 2,106,952 are also pertinent. The U.S. Pats. Nos. 2,838,374 and 2,344,104 deal with the reduction of sulfites and sulfates, while U.S. patent application Nos. 690,936, filed Dec. 15, 1967, and now allowed, and U.S. patent application No. 693,230, filed Dec. 26, 1967, relate to the use of aqueous alkali solutions for sulfur dioxide removal and subsequent processing of the resulting alkali sulfite to form useful products.

SUMMARY OF THE INVENTION

In the present invention, the waste gases containing sulfur dioxide enter an absorption or scrubbing system, where sulfur dioxide is absorbed by an aqueous solution containing dissolved sodium sulfite and sodium bisulfite. Reaction takes place between sulfur dioxide and sodium sulfite in aqueous solution, to form further sodium bisulfite in aqueous solution. A portion of the resulting bisulfite-rich scrubbing solution is recycled for further scrubbing, together with system makeup consisting of sodium carbonate, which reacts with sodium bisulfite to form sodium sulfite.

The bleed stream from the scrubbing system consists of an aqueous solution containing sodium sulfite and sodium bisulfite. The aqueous bleed solution is passed to a reactor, in which sodium carbonate is added to the bleed solution to convert all the sodium bisulfite to sodium sulfite. The resulting concentrated aqueous sodium sulfite solution is reduced to a sodium sulfide smelt at elevated temperature in a furnace or the like, by reaction with a carbon-containing reducing medium such as solid carbon or coal, carbon monoxide gas or methane. A product of the reaction, besides the sodium sulfide smelt, is carbon dioxide gas, which may be employed in the succeeding carbonation step. The sodium sulfide will generally be produced in the solid form or as a molten smelt, however the sodium sulfide may also be in the solution form. There may be some hydrogen sulfide formation at this stage.

The sodium sulfide smelt or solids stream is dissolved in water, and the resulting solution is carbonated in a tower, by bubbling a gas stream containing carbon dioxide through the solution. Reaction takes place between sodium sulfide, carbon dioxide and water in the aqueous solution, with the resultant formation of a sodium carbonate solution and liberation of gaseous hydrogen sulfide. The sodium carbonate solution is recycled to the process as described supra, while the off-gas rich in hydrogen sulfide discharged from the carbonating tower is processed to recover a valuable sulfur-containing product, such as elemental sulfur produced by the Claus process, or sulfuric acid. In an alternative, sodium sulfide in smelt or solid form may be reacted with carbon dioxide and steam at elevated temperature to form hydrogen sulfide and sodium carbonate.

The principal advantage of the process of the present invention is that sulfur dioxide is efficiently and substantially completely removed from a waste gas stream, so that the treated waste gas may be safely discharged to atmosphere without causing air pollution. Another advantage is that expensive materials or chemicals are not required for the process, since the only external component required is a carbon-containing reducing medium such as coal, or gaseous carbon monoxide or methane. A further advantage is that the sulfur dioxide is recovered and converted to a valuable sulfur-containing product such as elemental sulfur or sulfuric acid, which may be marketed to at least partially defray the expenses of the process.

It is an object of the present invention to provide an improved process for the removal of sulfur dioxide from waste gas streams such as flue gas.

Another object is to utilize an improved absorbent solution for scrubbing sulfur dioxide from waste gas streams.

A further object is to remove and recover sulfur dioxide from waste gas streams in the form of a valuable sulfur-containing product.

An additional object is to effectively and substantially completely remove sulfur dioxide from waste gas streams.

Still a further object is to remove sulfur dioxide from waste gases by reaction with sodium sulfite in aqueous solution, thereby forming sodium bisulfite which is readily converted back to sodium sulfite by reaction with sodium carbonate.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. The waste gas stream 1 containing sulfur dioxide and entrained fly ash is derived from a waste or flue gas source such as a steam power plant or the like, or one of the other process sources mentioned supra. Stream 1 will typically contain in the range of about 0.01% to 1% sulfur dioxide content, together with entrained fly ash and soot, balance carbon dioxide and nitrogen, and stream 1 will typically be derived at an elevated temperature generally in the range of 100° C. to 300° C. Stream 1 is passed into the upper end of waste gas scrubber 2, which may be any suitable device for gas-liquid contact and scrubbing for sulfur dioxide removal. In this embodiment of the invention, unit 2 accomplishes waste gas scrubbing and sulfur dioxide absorption by the provision of an internal inverted frusto-conical baffle 3, so that a venturi-type scrubbing action is attained. Aqueous scrubbing solution stream 4 containing dissolved sodium sulfite, and also containing a minor proportion of residual unconverted dissolved sodium bisulfite in most cases, is passed into unit 2 above and adjacent to the upper end of baffle 3, and flows downwards on the upper surface of baffle 3 for projection into the highly accelerated high velocity waste gas stream at the lower central opening baffle 3. The aqueous scrubbing liquor is thus projected and finely dispersed into the waste gas stream within unit 2 at a temperature typically in the range of 50° C. to 90° C., and sulfur dioxide absorption together with fly ash entrainment into the liquid phase take place in the lower part of unit 2. The scrubbed and cooled waste gas stream 5, now at a temperature typically in the range of 50° C. to 90° C. is discharged from unit 2 below baffle 3 and is passed to atmosphere or further utilization as desired. In most cases stream 5 will be saturated with water vapor and will contain less than 0.01% sulfur dioxide content by volume.

The absorption of sulfur dioxide into the aqueous scrubbing liquor within unit 2 also results in the conversion of at least a portion of the dissolved sodium sulfite to sodium bisulfite. The resulting aqueous liquor stream 6 discharged from unit 2 now contains dissolved sodium bisulfite, residual sodium sulfite, and entrained fly ash. A portion of stream 6 is recycled for further waste gas scrubbing via stream 7, which is combined with recycle sodium carbonate solution or solids stream 8. The addition of stream 8 to stream 7 serves to convert sodium bisulfite in stream 7 to sodium sulfite by reaction with sodium carbonate. Combination of streams 7 and 8 thus results in the formation of aqueous scrubbing liquid stream 4, which is utilized as described supra.

The balance of stream 6 passes via stream 9 to solids filter or centrifuge 10, which is any suitable device for separating entrained solids from a liquid stream. The separated solid fly ash stream 11 removed from unit 10 is passed to waste disposal or other utilization. The filtered and solids-free liquid stream 12 discharged from unit 10 now contains dissolved sodium sulfite and sodium bisulfite, and the dissolved sodium bisulfite in stream 12 is converted to sodium sulfite by reaction of stream 12 with added sodium carbonate within reactor unit 13. Sodium carbonate in solid or aqueous solution form is passed via stream 14 into unit 13, together with stream 12, and the resultant reaction of sodium bisulfite with sodium carbonate serves to form sodium sulfite and evolve gaseous carbon dioxide, which is removed via stream 15. Suitable heating means, not shown, may also be provided in unit 13 in order to heat and concentrate the solution by evaporation of water vapor, which is also removed via stream 15.

The resulting concentrated sodium sulfite solution stream 16 discharged from unit 13 is now passed to a suitable furnace or the like for elevated temperature reaction with a reducing gas and formation of a sodium sulfide smelt. In this embodiment of the invention, stream 16 is passed into fluid bed reactor 17, which is heated to a temperature generally in the range of 500° to 900° C., and a hot reducing gas stream 18 typically consisting of preheated carbon monoxide or methane or the like is passed into unit 17 below the fluid bed. As an alternative, stream 18 may consist of a hot combustion gas, in which case pulverized coal or other solid carbonaceous particles would be admitted into unit 17 together with stream 16. In any case, a hot off-gas stream 19 containing carbon dioxide is discharged from unit 17, together with a solids stream 20 consisting of a smelt or solid granules of sodium sulfide.

Stream 20 is now passed into solids dissolving tank 21, which is any suitable unit for dissolving the solids stream 20 in water stream 22. Unit 21 may be provided with a suitable internal stirrer or other agitation and dissolving means, not shown. The resulting aqueous sodium sulfide solution stream 23 formed in unit 21 is passed into carbonator 24, which is any suitable carbonation tower or gas-liquid contact mixer. The hot off-gas stream 19, which contains carbon dioxide, is passed into the lower end of unit 24 and rises through the body of liquor maintained at a temperature generally in the range of 40° C. to 90° C. within unit 24. In addition, carbon dioxide stream 25 derived from external sources such as streams 5 or 15 may also be passed into unit 24. The rising gaseous carbon dioxide within unit 24 reacts with the dissolved sodium sulfide component in the liquid phase, to form dissolved sodium carbonate and liberate gaseous hydrogen sulfide. The resulting off-gas stream 26 discharged from the upper end of unit 24 is rich in hydrogen sulfide, and stream 26 is processed in this embodiment of the invention to form elemental sulfur. Stream 26 is divided into portion streams 27 and 28. Stream 27 is passed to combustor 29 and reacted with air stream 30 in an exothermic combustion reaction which burns hydrogen sulfide to form sulfur dioxide. The resulting process gas stream 31 discharged from unit 29 now contains sulfur dioxide, and streams 31 and 28 are passed into catalytic reactor 32 for the reaction of sulfur dioxide with hydrogen sulfide in accordance with the Clause reaction, to yield elemental sulfur. The resulting process gas stream 33 discharged from unit 32 is rich in elemental sulfur vapor, which may be recovered by cooling of stream 33 to produce condensed liquid sulfur, or by other means known to the art such as by scrubbing stream 33 with liquid elemental sulfur or a suitable liquid solvent for elemental sulfur. In any case, elemental sulfur may be produced from stream 33 as a valuable commercial product.

Returning to unit 24, liquid stream 34 consisting essentially of an aqueous sodium carbonate solution is withdrawn from the bottom of unit 24, and stream 34 is employed in the present invention as a source of sodium carbonate for the conversion of sodium bisulfite to sodium sulfite. Stream 34 may be concentrated in means not shown, to produce a highly concentrated solution or even produce solid sodium carbonate, prior to recycle. In any case, stream 34 is divided into streams 8 and 14, which are utilized as described supra.

Numerous alternatives within the scope of the present invention, besides those mentioned supra, will occur to those skilled in the art. The ranges of process variables such as temperature enumerated supra constitute preferred embodiments of the invention for optimum utilization of the process concepts, and the invention may be practiced outside of these ranges in suitable instances. In some cases, such as when stream 1 is the tail gas from a sulfuric acid production facility or the like, the waste gas stream will be free of entrained solid particles. In this case, unit 10 and its function may be omitted, with stream 9 passing directly into unit 13. In other instances, a heavy loading of entrained solid particles may be present in stream 1, and unit 10 may serve to filter solids from stream 6 rather than stream 9, so that stream 7 will be free of entrained solid particles. Unit 17 may alternatively consist of a rotary kiln or other suitable reducing furnace, and may be heated by the combustion of a fluid hydrocarbon or the like within the unit. Stream 26 may alternatively be employed as a sulfur source for sulfuric acid manufacture, particularly when stream 1 is the tail gas from a sulfuric acid facility, in which case stream 26 would be recycled to the sulfuric acid facility for conventional utilization in acid manufacture by burning or oxidation to form sulfur dioxide, followed by catalytic oxidation to sulfur trioxide and absorption of the sulfur trioxide in concentrated sulfuric acid or oleum. Other alternatives may be mentioned. Stream 16 leaving reactor 13 and consisting essentially of an aqueous sodium sulfite solution may be concentrated and crystallized to obtain solid sodium sulfite crystals. Stream 16 may also be oxidized with air, oxygen or peroxides prior to crystallization, so that sodium sulfite is converted to sodium sulfate in solution, with the resulting solution being concentrated and crystallized to obtain product solid sodium sulfate crystals. If sodium sulfite or sodium sulfate are removed from the system as solid products, then stream 34 will be derived as make-up sodium carbonate solution from an external source. Finally, the sodium sulfide, either in the smelt or solid form, may be reacted with gaseous carbon dioxide and steam in a fluidized bed at elevated temperature, to form hydrogen sulfide and solid sodium carbonate. It will be understood that this procedure is functionally equivalent to the operation of unit 24, as described supra and as claimed.

An example of an industrial application of the process of the present invention will now be described.

EXAMPLE

The process of the present invention was applied to the flue gas generated by a commercial steam power boiler. Following are the temperatures and component flow rates or concentrations for principal process streams.

cycling the resulting first solution portion for further scrubbing of said waste gas stream, adding a second stream of sodium carbonate to said second solution portion, whereby substantially all of the dissolved sodium bisulfite in said second solution portion is converted to sodium sulfite, reacting the sodium sulfite content of the resulting second solution portion containing dissolved sodium sulfite with a carbon-containing reducing medium at elevated temperature, whereby sodium sulfite is reduced to sodium sulfide and a flue gas containing carbon dioxide is formed, dissolving said sodium sulfide in water to form an aqueous sodium sulfide solution, passing a gas stream containing carbon dioxide in contact with said sodium sulfide solution, whereby gaseous hydrogen sulfide is evolved from said solution and an aqueous solution principally containing sodium carbonate is formed, processing said gaseous hydrogen sulfide to form a sulfur-containing product, and dividing and recycling the sodium carbonate content of said aqueous solution principally containing sodium carbonate for reaction with sodium bisulfite as said first and second streams of sodium carbonate.

2. The process of claim 1, in which said carbon-containing reducing medium is selected from the group consisting of elemental solid carbon, gaseous carbon monoxide and gaseous methane.

3. The process of claim 1, in which at least a portion of said gas stream containing carbon dioxide, which is passed in contact with said sodium sulfide solution, is derived from said flue gas containing carbon dioxide.

4. The processes of claim 1, in which said gaseous hydrogen sulfide is processed to form a sulfur-containing product by oxidizing a portion of said hydrogen sulfide to sulfur dioxide, combining said sulfur dioxide with the balance of said hydrogen sulfide to form a mixed gaseous stream, catalytically reacting said mixed gaseous stream whereby sulfur dioxide and hydrogen sulfide react to form elemental sulfur vapor, and recovering pure elemental sulfur from the resulting reacted gas stream.

5. The process of claim 1, in which said gaseous hydrogen sulfide is processed to form a sulfur-containing product by oxidizing all of said hydrogen sulfide to sulfur dioxide, catalytically oxidizing the resulting sulfur dioxide to sulfur trioxide, and absorbing said sulfur trioxide in concentrated sulfuric acid to form further sulfuric acid in solution.

| Stream No.: | Temp. °C. | Component | Flow rate or concentration |
|---|---|---|---|
| 1 | 150 | total flue gas | 2,832 actual cubic meters/minute. |
| 1 | 150 | sulfur dioxide | 2,000 parts per million (p.p.m.). |
| 1 | 150 | fly ash | 159 grains/standard cubic meter. |
| 5 | 54 | total exit gas | 2,490 actual cubic meters/minute. |
| 5 | 54 | sulfur dioxide | 100 p.p.m. |
| 5 | 54 | fly ash | 1.59 grains/standard cubic meter. |
| 4 | 54 | total stream | 13,250 liters/minute. |
| 9 | 54 | total stream | 1,325 liters/minute. |
| 11 | 54 | total stream | 20.8 kilograms/minute. |
| 14 | 54 | sodium carbonate | 90.7 kilograms/minute. |
| 16 | 54 | sodium sulfite | 204 kilograms/minute. |
| 18 | 150 | carbon monoxide | 136 kilograms/minute. |
| 19 | 870 | carbon dioxide | 192 kilograms/minute. |
| 20 | 870 | sodium sulfide | 127 kilograms/minute. |
| 22 | 20 | water | 1140 kilograms/minute. |
| 23 | 20 | total stream | 1267 kilograms/minute. |
| 26 | 20 | hydrogen sulfide | 55.3 kilograms/minute. |
| 34 | 20 | sodium carbonate | 172 kilograms/minute. |

Unit 17 was operated at a temperature in the range of 980° C. to 1090° C.

I claim:

1. A process for the removal of sulfur dioxide from a waste gas stream containing sulfur dioxide which comprises scrubbing said waste gas stream with an aqueous scrubbing solution containing dissolved sodium sulfite, whereby sulfur dioxide is absorbed into said aqueous scrubbing solution and sodium bisulfite is formed in solution, dividing the resulting aqueous solution containing dissolved sodium sulfite and sodium bisulfite into a first portion and a second portion, adding a first stream of sodium carbonate to said first solution portion, whereby at least a portion of the dissolved sodium bisulfite in said first solution portion is converted to sodium sulfite, re- 6. The process of claim 1, in which said waste gas stream is a flue gas containing entrained solid fly ash particles, and said second portion of said resulting aqueous solution derived from waste gas scrubbing and containing dissolved sodium sulfite and sodium bisulfite is initially processed to remove solid fly ash, prior to addition of said second stream of sodium carbonate.

7. The process of claim 1, in which said waste gas scrubbing takes place at a temperature in the range of 50° C. to 90° C., the reduction of sodium sulfite to sodium sulfide takes place at a temperature in the range of 500° C. to 900° C., and carbon dioxide is passed in contact with said sodium sulfide solution at a temperature in the range of 40° C. to 90° C.

References Cited

UNITED STATES PATENTS

| | | | |
|---|---|---|---|
| 1,023,179 | 4/1912 | Strickler | 23—129 |
| 2,161,056 | 6/1939 | Johnstone et al. | |
| 2,163,554 | 6/1939 | Gaither | 23—134 |
| 2,922,735 | 1/1960 | Johnstone | 23—178 |
| 3,337,294 | 8/1967 | Ono et al. | 23—63 |
| 3,438,734 | 4/1969 | Grantham et al. | 23—134 |
| 3,477,815 | 11/1969 | Miller et al. | 23—178 |

OSCAR R. VERTIZ, Primary Examiner

C. B. RODMAN, Assistant Examiner

U.S. Cl. X.R.

23—2, 63, 130, 225